US012702128B2

(12) United States Patent
Diprose et al.

(10) Patent No.: US 12,702,128 B2
(45) Date of Patent: Aug. 11, 2026

(54) APPARATUS AND METHOD FOR ELECTRICALLY KILLING PLANTS

(71) Applicant: Ubiqutek Ltd., Birmingham (GB)

(72) Inventors: Andrew Diprose, London (GB); Michael Diprose, Hope Valley (GB)

(73) Assignee: Ubiqutek Ltd., Birmingham (GB)

(*) Notice: Subject to any disclaimer, the term of this patent is extended or adjusted under 35 U.S.C. 154(b) by 276 days.

(21) Appl. No.: 17/426,374

(22) PCT Filed: Mar. 10, 2020

(86) PCT No.: PCT/EP2020/056383
§ 371 (c)(1),
(2) Date: Sep. 23, 2021

(87) PCT Pub. No.: WO2020/182829
PCT Pub. Date: Sep. 17, 2020

(65) Prior Publication Data

US 2022/0095605 A1 Mar. 31, 2022

(30) Foreign Application Priority Data

Mar. 11, 2019 (GB) ..................................... 1903312

(51) Int. Cl.
*A01M 17/00* (2006.01)
*A01M 19/00* (2006.01)
*A01M 21/04* (2006.01)

(52) U.S. Cl.
CPC ................................. *A01M 21/046* (2013.01)

(58) Field of Classification Search
CPC .... A01M 21/046; A01M 17/00; A01M 19/00; A01M 99/00; A01M 21/04; E01H 11/00;
(Continued)

(56) References Cited

U.S. PATENT DOCUMENTS 2,468,972 A 5/1949 Hagerty
2,484,443 A * 10/1949 Baker ................ A01M 21/046 47/1.3

(Continued)

FOREIGN PATENT DOCUMENTS

EP 3557750 A1 10/2019

OTHER PUBLICATIONS

International Search Report, mailed May 20, 2020, in PCT/EP2020/056383, filed Mar. 10, 2020.

(Continued)

*Primary Examiner* — Peter M Poon
*Assistant Examiner* — Sahar Almatrahi
(74) *Attorney, Agent, or Firm* — Dunlap Codding, P.C.

(57) ABSTRACT

Electrical apparatus to kill a plant or at least attenuate plant growth, the apparatus comprising: an electrical energy supply unit; an applicator unit comprising an applicator electrode; a return unit comprising a return electrode; electrical circuitry; the electrical energy supply unit arranged to apply electrical energy through a transmission circuit comprising the applicator electrode, and the return electrode, wherein the electrical circuitry arranged to control an electrical impedance of the electrical energy supply unit to control a property of the electrical energy to the electrodes.

19 Claims, 5 Drawing Sheets

(58) Field of Classification Search
CPC ........ G01R 27/16; G01R 27/18; A01B 47/00; A01G 7/04
USPC ........................................................... 47/1.3
See application file for complete search history.

(56) References Cited

U.S. PATENT DOCUMENTS 3,935,670 A * 2/1976 Pluenneke .......... A01M 21/046 47/1.3
4,338,743 A 7/1982 Gilmore
4,428,150 A * 1/1984 Geiersbach ......... A01M 21/046 47/1.3
5,600,918 A 2/1997 Carr
5,673,637 A * 10/1997 Colburn, Jr. ......... A01C 21/007 47/1.3
11,684,060 B2 * 6/2023 De Andrade Coutinho Filho ...... A01M 21/046 47/1.3
2006/0265946 A1 11/2006 Schwager et al.
2007/0208520 A1 9/2007 Zhang et al.
2015/0027044 A1 * 1/2015 Redden .................... A01G 7/06 47/58.1 R
2018/0055036 A1 3/2018 Diprose
2018/0132473 A1 5/2018 Diprose
2020/0205395 A1 * 7/2020 De Andrade Coutinho Filho ...... H02H 7/10

OTHER PUBLICATIONS

Written Opinion of the International Searching Authority, mailed May 20, 2020, in PCT/EP2020/056383, filed Mar. 10, 2020.
Office Action dated May 24, 2023, in U.S. Appl. No. 17/425,854, filed Jul. 26, 2021.

* cited by examiner

| | Voltage | | | | | | | | |
|---|---|---|---|---|---|---|---|---|---|
| Load | 60Hz | 55kHZ | 50kHz | 45kHz | 40kHz | 35kHz | 30kHZ | 25kHz | 20kHz |
| 10 | 6 | 6 | 7 | 8 | 9 | 10 | 12 | 14 | 16 |
| 100 | 57 | 63 | 69 | 76 | 85 | 98 | 114 | 136 | 155 |
| 220 | 125 | 137 | 150 | 166 | 186 | 212 | 246 | 293 | 332 |
| 470 | 263 | 286 | 315 | 348 | 390 | 443 | 511 | 604 | 681 |
| 1,000 | 539 | 590 | 649 | 719 | 802 | 903 | 1,027 | 1,178 | 1,287 |
| 2,200 | 1,104 | 1,234 | 1,377 | 1,525 | 1,673 | 1,807 | 1,922 | 2,011 | 2,042 |
| 4,700 | 1,978 | 2,385 | 2,812 | 3,145 | 3,264 | 3,179 | 2,986 | 2,792 | 2,663 |
| 10,000 | 2,810 | 3,890 | 5,377 | 6,298 | 5,713 | 4,618 | 3,791 | 3,298 | 3,097 |
| 22,000 | 3,233 | 5,033 | 9,134 | 12,139 | 8,431 | 5,473 | 4,140 | 3,502 | 3,299 |
| 47,000 | 3,380 | 5,481 | 12,827 | 20,506 | 10,160 | 5,775 | 4,270 | 3,593 | 3,397 |
| 100,000 | 3,445 | 5,663 | 15,377 | 29,172 | 10,953 | 5,908 | 4,348 | 3,654 | 3,456 |

| | Power | | | | | | | | |
|---|---|---|---|---|---|---|---|---|---|
| Load | 60Hz | 55kHZ | 50kHz | 45kHz | 40kHz | 35kHz | 30kHZ | 25kHz | 20kHz |
| 10 | 3 | 4 | 5 | 6 | 7 | 10 | 13 | 19 | 25 |
| 100 | 33 | 39 | 47 | 58 | 73 | 95 | 129 | 184 | 240 |
| 220 | 71 | 85 | 102 | 125 | 158 | 204 | 275 | 389 | 502 |
| 470 | 147 | 175 | 210 | 258 | 324 | 417 | 556 | 777 | 987 |
| 1,000 | 291 | 348 | 422 | 517 | 644 | 816 | 1,054 | 1,387 | 1,657 |
| 2,200 | 554 | 692 | 861 | 1,058 | 1,272 | 1,485 | 1,678 | 1,839 | 1,896 |
| 4,700 | 832 | 1,210 | 1,683 | 2,104 | 2,267 | 2,150 | 1,897 | 1,659 | 1,509 |
| 10,000 | 790 | 1,513 | 2,891 | 3,967 | 3,264 | 2,133 | 1,437 | 1,088 | 959 |
| 22,000 | 475 | 1,151 | 3,792 | 6,697 | 3,231 | 1,362 | 779 | 558 | 495 |
| 47,000 | 243 | 639 | 3,501 | 8,947 | 2,196 | 710 | 388 | 275 | 245 |
| 100,000 | 119 | 321 | 2,365 | 8,510 | 1,200 | 349 | 189 | 133 | 119 |

APPARATUS AND METHOD FOR ELECTRICALLY KILLING PLANTS

TECHNICAL FIELD

The present disclosure relates to electric apparatus that is configured to attenuate plant growth by the application of electrical energy thereto.

BACKGROUND

In properties both commercial and domestic it is common to kill or at least control the growth of unwanted plants, commonly referred to as weeds. Conventional methods include treatment with a pesticide or more particularly a herbicide. However, there is a growing concern over such treatment for environmental reasons and unwanted exposure of herbicides to humans and animals. Moreover, weeds are increasingly becoming naturally resistant so herbicides are becoming more and more ineffective. As a result of these numerous drawbacks consumers are increasingly demanding organic produce, for which the use of herbicides is prohibited.

Consequently, there is a desire for alternative treatments, which do not include the above drawbacks. An example includes treatment by the application of electrical energy. U.S. Pat. No. 4,338,743 discloses such apparatus, wherein an electrical energy is applied at 14.4 kV at 60±5 Hz to plants. Such apparatus have failed to become widespread in the market. One reason is that it is particularly difficult to effectively apply the electrical energy to the plant. This may be for a variety of reasons, which can include a variable electrical resistance of the plant, which occurs as the cells of the plant break down during treatment with the electrical energy. Other reasons include movement between an electrode applying the electrical energy and the plant.

Therefore, in spite of the effort already invested in the development of said apparatus further improvements are desirable.

SUMMARY

The present disclosure provides electrical apparatus to kill a plant or at least attenuate plant growth. The apparatus includes an electrical energy supply unit; an applicator unit comprising an applicator electrode; a return unit comprising a return electrode, and; electrical circuitry. The electrical energy supply unit arranged to apply electrical energy through a transmission circuit comprising the applicator electrode and the return electrode and the plant.

In embodiments, the electrical circuitry is arranged to control an electrical impedance of the electrical energy supply unit to control a property of the electrical energy to the electrodes. By implementing control of the electrical impedance to control of a property of the electrical energy to the electrodes, the electrical energy to the weed can be conveniently controlled to optimize killing of the weed and/or safety of the apparatus. The controlled property of the electrical energy may comprise one or more of the: voltage; current; power; and phase.

In embodiments, the electrical circuitry implements a plant monitoring system to determine an electrical property related to an electrical impedance of the plant, e.g. an impedance between said electrodes. In embodiments the electrical circuitry is arranged to control an electrical impedance of the electrical energy supply unit based on said determined electrical property related to the electrical impedance of the plant.

By implementing control of the impedance of the electrical energy supply unit, based on the determined electrical property related to the electrical impedance of the plant, the electrical energy applied from the electrodes may be conveniently controlled (e.g. to apply the optimum electrical energy to kill the weed).

In embodiments, the electrical energy supply unit and transmission circuit are arranged with the electrical impedance of the electrical energy supply unit to control a power of the electrical energy applied through the transmission circuit between said electrodes. The power to the weed may therefore be conveniently controlled based on the impedance of the weed as said impedance of the weed changes during treatment of the weed. Control of the power in this way may enable the optimum power to be applied to kill the weed.

In embodiments, the impedance determination system is arranged to determine the electrical property related to an electrical impedance of the plant by measuring one or more properties of the electrical energy through the transmission circuit, e.g. between the electrodes. By measuring the electrical energy through the transmission circuit to determine the electrical property related to an electrical impedance of the plant, a more cost effective and/or accurate plant monitoring system may be implemented, e.g. when compared to a plant monitoring system based on a dedicated separate signal or a camera system to estimate the impedance or other property based on optical data.

In embodiments, the electrical circuitry to control the electrical energy supply unit to maintain an impedance thereof to be within a predetermined amount of an electrical impedance between the electrodes, which is determined with the plant monitoring system. The predetermined amount may be within 2.5% or 5% or 10% or 15%. By matching the impedance optimum power and/or efficiency of the electrical energy supply unit may be achieved.

In embodiments, the electrical energy supply unit and transmission circuit are arranged with a reduction of electrical impedance of the electrical energy supply unit to increase the power of the electrical energy applied through the transmission circuit between said electrodes. The decrease in the impedance of the electrical energy supply unit may be based on a decrease in impedance of the plant, which may be determined with the determined electrical property.

In embodiments, the electrical energy supply unit includes an inductive element and a capacitive element arranged as a resonant circuit, wherein the electrical circuitry arranged to change the electrical impedance of the electrical energy supply unit by changing one or more of: a frequency (e.g. not the duty cycle, since the duty cycle relates to an on/off period of a pulse and not a frequency of pulses) of the electrical energy; an inductance of the inductive element; a capacitance of the capacitive element. By implementing a resonant circuit, the impedance can be conveniently and/or quickly controlled by adjustment of one or more of said variables. In embodiments, the inductive and capacitive element are arranged in series, with the applicator electrodes and earth electrodes arranged over the capacitive element. In embodiments, the electrical circuitry is arranged to operate the resonant circuit proximal resonance but offset therefrom e.g. by at least ±1% or 2.5% or 5% or 10% or 15% or 20% or 30% or 40% or 50% of the resonant frequency. By operating slightly above/below resonance strain on the circuitry may be reduced.

In embodiments, the electrical circuitry is arranged to transition the impedance of the power supply unit to a lower value, when the determined electrical property indicates the impedance of the plant is below a threshold. In this way the electrical energy applied to the plant can be optimized as the impedance of the plant decays during treatment, and be within the safe capabilities of the power supply. In embodiments, the electrical circuitry is arranged to transition the impedance of the power supply unit to a plurality of lower values, e.g. wherein each value is sequentially lower than the previous value, each corresponding to one of a plurality of sequentially lower thresholds for the determined electrical property. By implementing a plurality of thresholds a more sophisticated control can be implemented to more effectively kill a plant.

In embodiments, the electrical circuitry is arranged to control the electrical energy to be applied as at least a first stage and a second stage. In embodiments, during the first stage an electrical potential over the electrodes is controlled to be above a first threshold, wherein during the second stage an electrical potential over the electrodes is controlled to be below the first threshold. By applying a high voltage to the weed during the first stage, the electrical energy may be selected to be effective in punching though cells forming an interior and/or outer surface of the weed so that an electrical resistance of the weed can be quickly broken down to establish an electrical current.

In embodiments, the electrical circuitry is arranged to transition to the second stage when the determined electrical property indicates the impedance of the plant is below a transition threshold. By transitioning to the second stage based on the impedance of the weed, the power applied to the weed can be optimally controlled, e.g. based on the weed impedance for optimal killing of the weed.

In embodiments, the electrical circuitry is arranged to control the power of the electrical energy during the second stage to be greater than in an alternative second stage wherein the impedance of the power supply was not changed from that of the first stage. By controlling the power to be greater in the second stage than if the power was applied in the second stage with the same impedance of the power supply for the first stage maintained in the second stage, the power can be increased for optimum killing of the weeds, whilst being within the safe capabilities of the power supply.

In embodiments, the electrical circuitry is arranged to, prior to the first stage, increase said electrical potential of the electrical energy to the first threshold, over a predetermined period of time. By increasing the electrical potential up to the first threshold (i.e. from a lower electrical potential) the safety of the apparatus may be increased.

In embodiments, the electrical circuitry is arranged to determine, based on the determined electrical property, that the electrical impedance of the plant is above a treatment completion threshold and to re-execute the first stage. The treatment completion threshold may be selected to correspond to an open circuit between the electrodes (e.g. indicating the weed has been killed or the electrode has moved away from the weed) in which case the first stage is applied again to reset for another weed.

In embodiments, the electrical circuitry is arranged to, determine, based on the determined electrical property, the electrical impedance as below a short circuit threshold and to prevent supply of the electrical energy to the electrodes. The short circuit threshold may be selected to correspond to a short circuit between the electrodes (e.g. indicating the electrodes are touching) in which case the electrical energy to the electrodes is prevented to reduce the likelihood of damage to the apparatus.

In embodiments, the electrical circuitry is arranged to control the current of the electrical energy during the first stage to be less than or equal to the current during the second stage. With a low current, high voltage first phase plant cells can be effectively punched through, which significantly lowers the impedance between the terminals after which the high power/current second stage can have optimal effect in killing the weed.

In embodiments, the first threshold is above 1 kV or above; 3 kV or above; 5 kV or above; 15 kv or above; 30 kv or above. In embodiments, wherein upon transitioning to the second stage the voltage may be set to at least: 20% or 30% or 40 or 50% lower than the first threshold. In embodiments, wherein upon transitioning to the second stage the current may be controlled to be at least: 20% or 30% or 40% or 50% higher than during the first stage. In embodiments the first stage is set for a predetermined amount of time, that is less than or equal to: 10 ms; or 20 ms; or 100 ms; or 1000 ms; or 5000 ms after which the second stage is transitioned to. In embodiments, a time duration of the second phase is greater than that of the first phase.

In embodiments, the electrical circuitry is arranged to cyclically execute the at least first and second stage, e.g. to repeat the at least first and second stages as part of a cycle again and again.

In embodiments, electrical property related to an electrical impedance of the plant is continuously monitored and the power adjusted based on the determined electrical property. By continuously adjusting the power based on the impedance of the weed it can be ensured that the optimal power to kill the weed is transferred to the weed.

In embodiments which do not implement control based on the impedance of the electrical energy supply unit, the voltage and power of the electrical energy can be controlled via selecting a tapping on a transformer, or and/or changing an input voltage to a transformer or other suitable method.

The present disclosure provides use of the apparatus as disclosed herein for treatment of a plant, e.g. to kill the plant. The use may implement any feature of the preceding embodiment or another embodiment disclosed herein.

The present disclosure provides an electrical energy supply unit configured to implement the features of any preceding embodiment or another embodiment disclosed herein.

The present disclosure provides a method of treating a plant with electrical energy, the method comprising: applying electrical energy to the plant from an applicator electrode and earth electrode; controlling an electrical impedance of the electrical energy supply unit to control the electrical energy to the plant.

In embodiments, the method comprises: determining an electrical property related to an electrical impedance of the plant between said electrodes; controlling the electrical impedance of the electrical energy supply unit based on the determined said electrical property.

In embodiments, the method comprises applying electrical energy to the plant from an applicator electrode and return electrode in a first stage and second stage. In embodiments, during the first stage an electrical potential over the electrodes is controlled to be above a first threshold, wherein during the second stage an electrical potential over the electrodes controlled to be below the first threshold.

The method may implement any feature of the preceding embodiment or another embodiment disclosed herein. The present disclosure provides electrical circuitry or a computer program to implement the method of the preceding embodiment or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
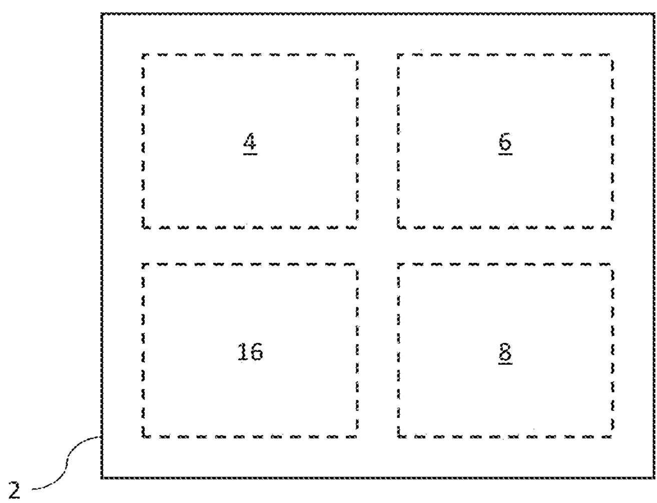
FIG. 1 is a block system diagram showing embodiment electrical apparatus to attenuate plant growth.

Before describing several embodiments of the apparatus, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein "plant" or "weed" may refer to one or more undesired plants in a human controlled setting, such as a farm field, garden, lawn or park. A weed may refer to a multicellular photosynthetic eukaryote.

As used herein "electrical arc" or "arc" may refer to an electrical breakdown of a gas that produces an electrical discharge. An arc is formed by an electrical current through a normally nonconductive medium such as air, and is characterized by a plasma, which may produce visible light. An arc discharge is characterized by a lower voltage than a glow discharge and relies on thermionic emission of electrons from the electrodes supporting the arc.

As used herein "impedance" or "electrical impedance" may refer to the effective resistance of an electric circuit or component (which can include a plant arranged between applicator and return electrodes) to alternating current, arising from the combined effects of ohmic resistance and reactance.

As used herein "plant monitoring system" or "monitoring system" may refer to a system operable to determine an electrical property, i.e. in real time, related to an electrical impedance of the plant. The electrical property of the plant may be determined by a property of electrical energy applied to the plant, e.g. the electrical energy applied between applicator and return electrodes.

As used herein "electrical property related to an electrical impedance of the plant" or "electrical property of the plant" or "electrical property" or "determined electrical property" may refer to one or more electrical quantities that can be measured, which are representative of, or equate to, an electrical impedance of a plant, and can include: a voltage drop over the plant, including a change in voltage drop; an electrical current, including a change in said current, through the plant; an electrical power, including a change in said power, through the plant; a phase, including a phase difference; conductance.

As used herein "electrical energy" may refer to the electrical energy applied to the plant, e.g. though a transmission circuit. The electrical energy may comprise a periodic or aperiodic waveform, i.e. a waveform that continuously repeats with the repeating units therein having a constant or a varying period, e.g. a pulsed wave with a fixed duty cycle or a varying duty cycle. The shape of the repeating unit may be one of or a combination of one or more of the following forms: sine wave; saw-tooth wave; triangular wave; square wave; pulsed, e.g. DC pulsatile, half-wave rectified; other known form. The exact shape of the repeating unit may be an approximation of one of the aforesaid forms for reasons of distortion, e.g. overshoot/undershoot and the associated ringing and settle time. The repeating unit may be positive or negative or a combination thereof with respect to a reference value, which is typically 0 V. The frequency of the waveform may be above 1 kHz or 18 kHz or 25 kHz. It will be understood that when referring to the voltage of the electrical energy, when the electrical energy has a waveform, the voltage is in respect of a suitable quantity, such as RMS, peak or other. The same applies for other electrical quantities such as power and current.

As used herein "camera" or "camera system" may refer to a system comprising one or more cameras operable to capture images in a suitable band (including visible, infra-red or UV) for detecting an electrical arc. A camera may include any suitable image sensor for capturing emissions, e.g. a photodiode and other semiconductor systems.

As used herein "power supply unit" or "electrical energy processing unit" may refer to any unit or system, including a distributed system, for generating and/or conditioning electrical energy for supply to a transmission circuit which, in use, incorporates a plant.

As used herein, the term "electrical circuitry" or "electric circuitry" or "electronic circuitry" or "circuitry" or "control circuitry" may refer to, be part of, or include one or more of the following or other suitable hardware or software components: an Application Specific Integrated Circuit (ASIC); electronic/electrical circuit (e.g. passive components, which may include combinations of transistors, transformers, resistors, capacitors); a processor (shared, dedicated, or group); a memory (shared, dedicated, or group), that may execute one or more software or firmware programs; a combinational logic circuit. The electrical circuitry may be centralised on the apparatus or distributed, including distributed on board the apparatus and/or on one or more components in communication with the apparatus, e.g. as part of the system. The component may include one or more of a: networked-based computer (e.g. a remote server); cloud-based computer; peripheral device. The circuitry may be implemented in, or functions associated with the circuitry may be implemented by, one or more software or firmware modules. The circuitry may include logic, at least partially operable in hardware.

As used herein, the term "processor" or "processing resource" may refer to one or more units for processing including as an ASIC, microcontroller, FPGA, microprocessor, digital signal processor (DSP) capability, state machine or other suitable component. A processor may include a computer program, as machine readable instructions stored on a memory and/or programmable logic. The processor may have various arrangements corresponding to those discussed for the circuitry, e.g. on-board and/or off board the apparatus as part of the system.

As used herein, the term "computer readable medium/media" or "data storage" may include conventional non-transient memory, for example one or more of: random access memory (RAM); a CD-ROM; a hard drive; a solid state drive; a flash drive; a memory card; a DVD-ROM; a floppy disk; an optical drive. The memory may have various arrangements corresponding to those discussed for the circuitry/processor.

As used herein, the term "information carrying medium" may include one or more arrangements for storage of information on any suitable medium. Examples include: data storage as defined herein; a Radio Frequency Identification (RFID) transponder; codes encoding information, such as optical (e.g. a bar code or QR code) or mechanically read codes (e.g. a configuration of the absence or presents of cut-outs to encode a bit, through which pins or a reader may be inserted).

As used herein "applicator unit" or "applicator" may refer to any suitable device for applying electrical energy to a plant, including by direct contact with the plant and/or spark transmission.

As used herein "earth unit" or "return unit" may refer to any suitable device for receiving electrical energy from a circuit including the plant and optionally the ground to complete a transmission circuit, including by direct contact with the plant/ground and/or spark transmission.

As used herein "apparatus" or "electrical apparatus" may refer to any combination of one or more of the following for treatment of a plant: power supply unit; electrical circuitry; applicator unit; return unit; return electrode; applicator electrode; transmission circuit.

Figure 2:
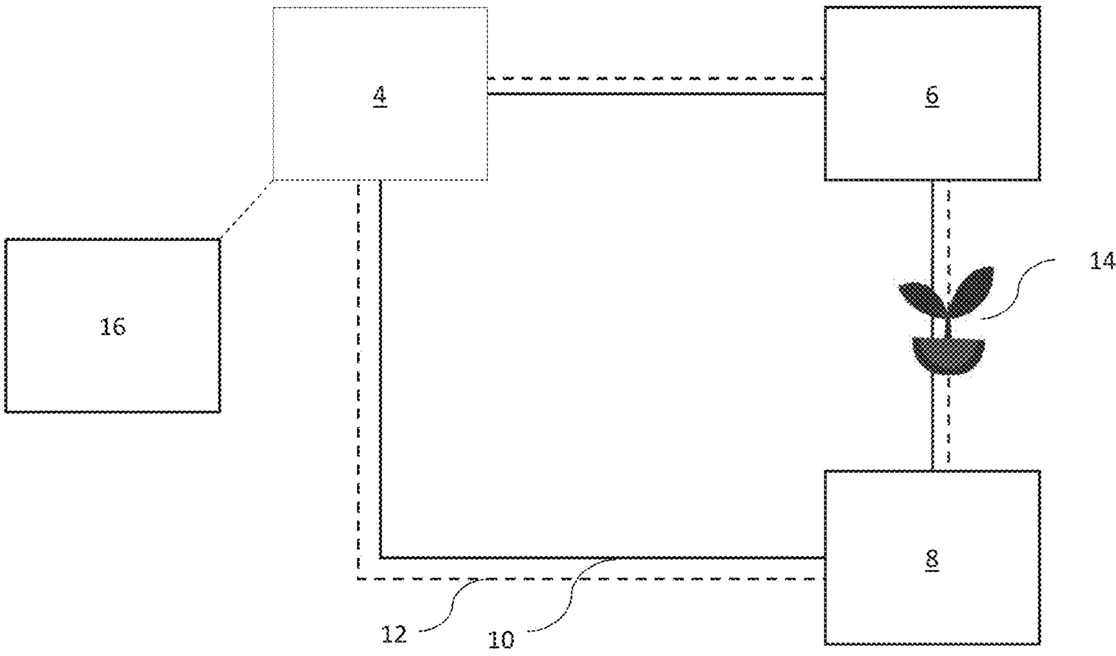
FIG. 2 is a schematic diagram showing the apparatus of FIG. 1.

Referring to FIGS. 1 and 2, electrical apparatus 2 to attenuate plant growth, comprises an electrical energy supply unit 4, an applicator unit 6 and an earth unit 8. The electrical energy supply unit supplies electrical energy 10 around a transmission circuit 12, which includes the applicator unit 6, earth unit 8.

The transmission circuit 12, when treating a plant, may include said plant 14. It will be understood that depending of the operative arrangement of the applicator unit and earth unit, a return path of the transition circuit 12 optionally includes other matter, such as proximal earth and fluid (e.g. air and moisture) to the plant.

The apparatus 2 includes electrical circuitry 16, which may implement a range of control operations. In embodiments, said circuitry 16 is operable to control the electrical energy supplied by the electrical energy supply unit 4 through the transmission circuit 12, as will be discussed.

Figure 3:
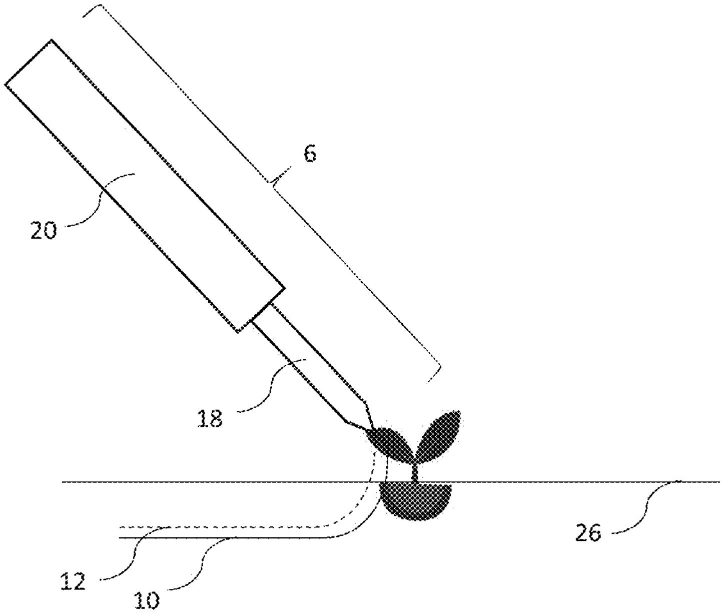
FIG. 3 is a schematic diagram showing an applicator unit of the apparatus of FIG. 1.

Referring to FIG. 3, the applicator unit 6 is adapted to receive electrical energy 10 from the electrical energy supply unit 4 and to transmit said electrical energy 10 to the plant 14 (shown in FIG. 2). The applicator unit 6 comprises an applicator electrode 18. The applicator electrode 18 is electrically connected to the electrical energy supply unit 4 by an electrically conductive material, e.g. by wiring or solid material, which forms part of the transmission circuit 12.

The applicator electrode 18 is adapted to apply the electrical energy 10 to the plant 14. In embodiments, the applicator electrode 18 is arranged for direct contact with the plant 14. As used herein "direct contact" may refer to physical contact between the plant and electrode, and may be achieved by operatively arranging the electrode to be exposed from a body of the applicator. The applicator electrode 18 comprises an electrically conductive material e.g. copper, zinc, bronze, brass, aluminum or steel.

The geometric configuration of the applicator electrode may be selected depending on the intended treatment regimen, for example: a rod for sweeping through areas of dense plants; a hook-shape for separating plants.

The applicator unit 6 comprises body 20 to carry the applicator electrode 18. The body 20 may be adapted to be held by a user or fixed to a chassis depending on the particular configuration of the apparatus 2 (e.g. adapted for domestic or agricultural implementation respectively).

In embodiments, which are not illustrated, the applicator electrode is implemented as a plurality of electrodes, e.g. for treatment of multiple plants at a given moment.

Figure 4:
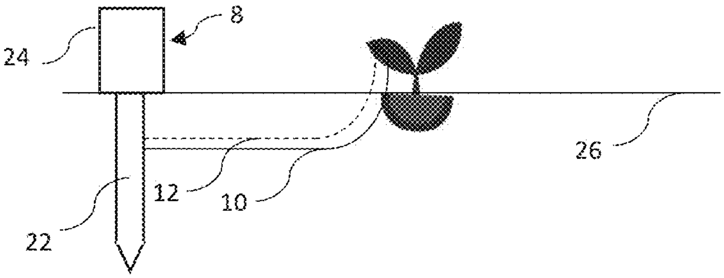
FIG. 4 is a schematic diagram showing an earth unit of the apparatus of FIG. 1.

Referring to FIG. 4, the earth unit 8 is adapted to receive electrical energy 10 from the electrical energy supply unit 6 via the plant 14 (shown in FIG. 2). The earth unit 8 comprises an earth electrode 22. The earth electrode 22 is electrically connected to the electrical energy supply unit 4 by an electrically conductive material, e.g. by wiring or solid material, which forms part of the transmission circuit 12.

The earth electrode 22 is adapted to provide a return for electrical energy 10 via the plant 14 to complete the transmission circuit 12. In embodiments, the earth electrode 22 is arranged for direct contact with the ground 26 (shown in FIG. 4). As used herein "direct contact" may refer to physical contact between the ground and electrode, and may be achieved by operatively arranging the electrode to be exposed from a body of the earth unit. The applicator electrode 18 comprises an electrically conductive material e.g. copper, zinc, bronze, brass, aluminum or steel.

The geometric configuration of the earth electrode may be selected depending on the intended implementation of the apparatus, for example: an implement for insertion into the ground (e.g. for apparatus that in use remains in a generally fixed position), such as a rod or spike; an implement for movement along the ground (e.g. for apparatus that in use has a variable position), such as a rod or spike), such as a flat plate or roller, and; a combination of the aforesaid implementations.

The earth unit 8 comprises body 24 to carry the earth electrode 22. The body 24 may be adapted to be held by a user or fixed to a chassis depending on the particular configuration of the apparatus 2 (e.g. adapted for domestic or agricultural implementation respectively).

In embodiments, which are not illustrated, the earth electrode is implemented as a plurality of electrodes, e.g. for treatment of multiple plants at a given moment.

Generally, the apparatus 2 is arranged with the earth electrode 22 arranged in operative proximity to the applicator electrode 18. Operative proximity may refer to a geometric arrangement to limit the path of the electrical energy 10 through the ground 26, which may advantageous for reasons of efficient and/or electrical safety.

Figure 5:
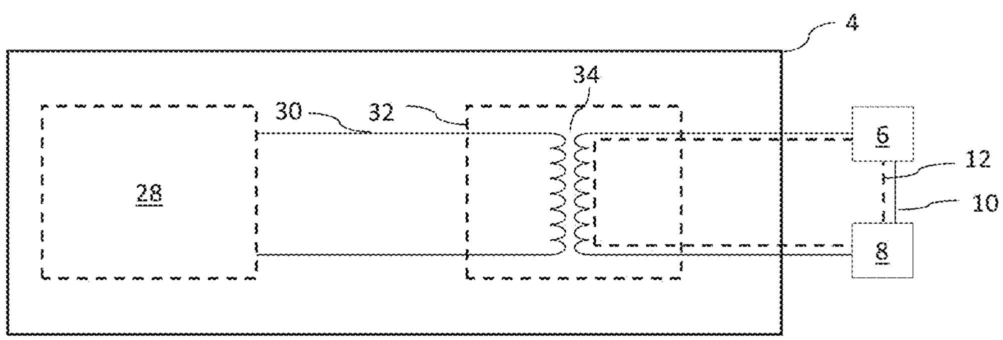
FIG. 5 is a schematic diagram showing an electrical energy supply unit of the apparatus of FIG. 1.

Referring to FIG. 5, the electrical energy supply unit 4 is arranged to supply electrical energy 10 to the transmission circuit 12. The electrical energy supply unit 4 includes a power supply 28 for supply of supply electrical energy 30. The power supply 28 may be implemented as one or more of the following: a battery; a fuel cell; a generator, including an internal combustion engine powered generator, with an alternator which may be implemented with a dedicated internal combustion engine or a shared internal combustion engine for other agricultural equipment, e.g. a tractor; other like system. The power supply 28 provides supply electrical energy 30, in alternating current (AC) or direct current (DC), including pulsated or with other form, with a fixed quantity, e.g. in one or more or power; voltage; current; frequency; phase.

The electrical energy supply unit 4 includes an electrical energy processing unit 32 for processing of the supply electrical energy 30 to the electrical energy 10, which may be referred to as processed electrical energy. The power supply unit 32 includes an electrical transformer 34 with appropriately configured windings, e.g. for step-up or step down, depending of the configuration of the supply electrical energy 30 and desired output of the electrical energy 10.

In embodiments, the electrical energy processing unit 32 implements a converter (not shown) to convert the supply electrical energy 30 to include a waveform suitable for the electrical transformer 34, e.g. AC or DC with pulsating or other variable waveform. As an example, wherein the power supply is an internal combustion engine powered generator, the converter implements an AC to DC converter and a switching system, e.g. a MOSFET, to switch the DC electrical energy though the electrical transformer 34. As an example, wherein the power supply is a battery, the converter implements said switching system to switch the DC electrical energy though the electrical transformer 34.

In embodiments of the electrical energy supply unit 4, which are not illustrated, the power supply 28 supplies electrical energy 10 of the desired configuration, consequently, the electrical energy processing unit 32 may be obviated, or in other embodiments the electrical transformer thereof may be obviated, whilst retaining the converter. In embodiments of the electrical energy supply unit 4, which are not illustrated, the electrical energy processing unit 32 includes an input unit to receive a commercial or domestic electrical supply, e.g. a mains supply, thus obviating the power supply 28.

The electrical circuitry 16 is implemented to control the electrical energy 10, through the transmission circuit 12. Said control may implement control of one or more of the following electrical quantities: electrical potential between the applicator and earth electrodes (e.g. by changing the taping over the transformer, which may be implemented as a variable transformer) and/or the frequency of the electrical energy; electrical current control (e.g. by changing the taping over the transformer, which may be implemented as a variable transformer); frequency control (e.g. by control of the switching system); phase (e.g. by implementing capacitance and/or inductance in the transmission circuit).

Figure 6:
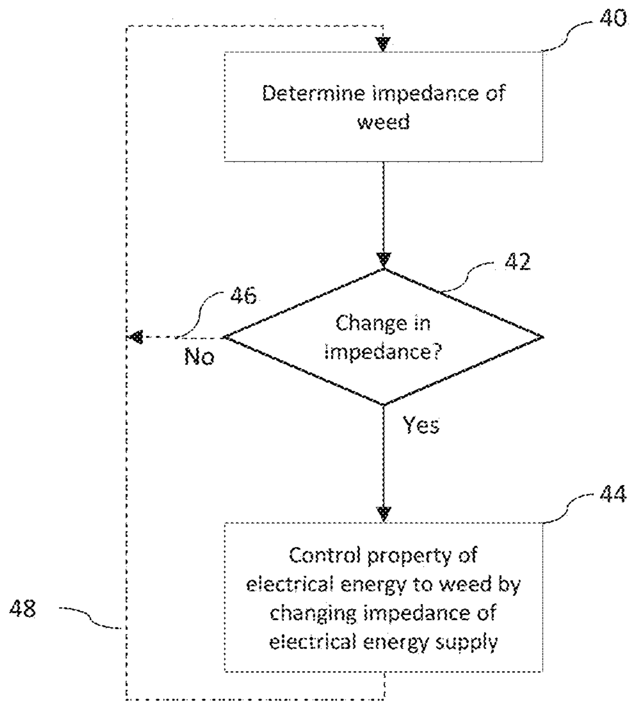
FIG. 6 is a flow diagram showing embodiment processes implemented by the apparatus of FIG. 1.

Referring to FIG. 6, in embodiments the electrical circuitry 16 at block 40 implements a plant monitoring system as defined herein to determine an electrical property, related to an electrical impedance of the plant, which is arranged between said electrodes 18, 22. At optional block 42 the electrical circuitry 16 determines if the determined electrical property has changed (e.g. since the last measurement or a default initial value in the instance of no prior measurement). If the change is greater than a predetermined amount, e.g. 1 to 5%, then block 44 is executed. Else loop 46 is executed and the electrical energy 10 to the electrodes maintained as unchanged. At block 44, an electrical impedance of the electrical energy supply unit 4 is controlled based on the determined electrical property from block 40, e.g. by using a stored relationship (which may be empirically obtained) that is implemented on memory. A property of the electrical energy 10 to the electrodes 18, 22 may be controlled by the impedance of the electrical energy supply unit 4. The property of the electrical energy 10 may comprise one or more of the: voltage; current; power; phase. Examples of said control are provided in the following embodiments.

Loops 48 and 46 are optionally executed for continuous monitoring of the impedance and control of the impedance of the electrical energy supply 4. "Continuous" as used herein may refer to a measurement and control step implemented for every cycle/pulse of the electrical energy 10, or a regular periodic measurement and control step, e.g. every 50 of 100 cycle/pulse.

In variant embodiments, which are not illustrated, the electrical circuitry 16 is arranged to control an electrical impedance of the electrical energy supply unit 4 to control a property of the electrical energy to the electrodes without the plant monitoring system, i.e. control of the electrical impedance of the electrical energy supply unit 4 is not based on the determined or electrical property 18, 22.

In embodiments, the plant monitoring system (not shown) determines the electrical property by measuring one more properties of the electrical energy 10 through the transmission circuit, e.g. an ammeter or current transformer is arranged to measure the electrical current through the transmission circuit 18 and a volt meter is arranged to measure the change in electrical potential over the electrodes 18, 22. Magnitude and phase can then be determined from the volt meter and ammeter to obtain the impedance.

In variant embodiments, other componentry may be implemented for measuring the impedance from the electrical energy, e.g. a wattmeter and oscilloscope. In embodiments, the plant measuring system may implement a separate signal generator to generate a dedicated signal for determining the electrical property, said signal may be applied though the transmission circuit (e.g. with filters to separate it from the electrical energy 10) or via a dedicated circuit. In embodiments, the plant monitoring system is implemented as a camera system to estimate the electrical property based on optical data, e.g. a weight of the weed is estimated from its geometry and used via empirical data to determine the electrical property.

Figures 7, 8:
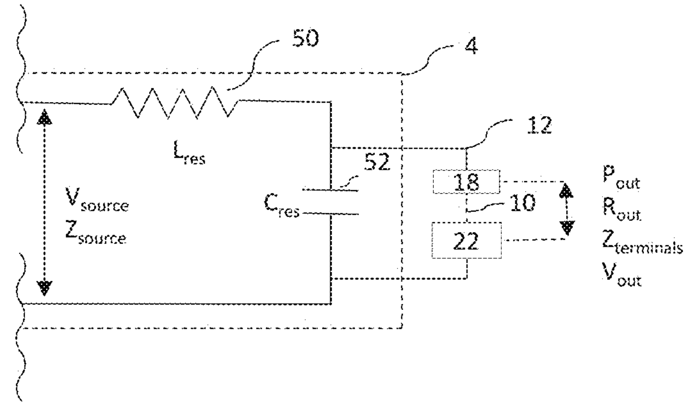
FIG. 7 is a schematic diagram showing embodiment circuitry for the apparatus of FIG. 1.
FIG. 8 are tabulated embodiment processes implemented by the apparatus of FIG. 1.

Referring to FIG. 7, in an embodiment the electrical energy supply unit 4 includes an inductive element 50 and a capacitive 52 element arranged in series as a resonant circuit, with the electrodes 18, 22 arranged to apply the electrical energy 10 to a weed over the capacitive element 52.

Referring FIG. 7, and equations 1 to 4 below, wherein: $V_{source}$ is the voltage of the electrical energy supply unit 4; $Z_{source}$ is the impedance of the electrical energy supply unit 4; $Z_{terminals}$ is the impedance across the electrodes 18, 22;

$V_{out}$ is the voltage across the electrodes 18, 22; $R_{out}$ is the resistance across the electrodes 18, 22; $P_{out}$ is the electrical power through the electrodes 18, 22, i.e. of electrical energy 10; Lies is the inductance of the inductor 50, $C_{res}$ is the capacitance of the capacitor 52; F is the frequency of the applied voltage.

$$P_{out}=V_{out}^2/R_{out} \quad (1)$$

$$V_{out}=V_{source}\times Z_{terminals}/(Z_{source}+Z_{terminals}) \quad (2)$$

$$Z_{source}=2\pi f L_{res} \quad (3)$$

$$Z_{terminals}=R_{out}/(1+2\pi f C_{res} R_{out}) \quad (4)$$

From equations 1 to 4, it will be understood that the impedance $Z_{source}$ of the electrical energy supply unit 4 can be changed by changing one or more of: a frequency F of the electrical energy; the inductance Lies of the inductive element 50; the capacitance Ores of the capacitive element 52.

The electrical circuitry 16 may control the switching system to change said frequency of the electrical energy 10.

In embodiments, the inductive element 50 and/or capacitive element 52 may be formed of a plurality of inductors/capacitors, which the electrical circuitry 16 switches between to change said inductance and capacitance respectively. Alternatively, the inductive element 50 and/or capacitive element 52 have variable inductance/capacitance, which is controlled by the electrical circuitry 16. Other suitable variable capacitance and/or inductance implementations are also contemplated.

In particular, the power (e.g. the electrical current) of the electrical energy 10 applied through the transmission circuit 12 between said electrodes 18, 22 can be controlled by changing the aforementioned quantities. The power to the weed may therefore be conveniently controlled.

The electrical energy supply unit 4 and transmission circuit 12 are arranged with a reduction of electrical impedance of the electrical energy supply unit 4 to increase the power of the electrical energy applied through the transmission circuit 12 between said electrodes 18, 22. In particular, the embodiment circuit of FIG. 7 acts as a potential divider, wherein a lower source impedance $Z_{source}$ acts to push more power $P_{out}$ through the electrodes.

Referring to FIG. 8, an example of the aforementioned control of the resonant circuit is illustrated in tabular form. In the example embodiment the determined electrical property, which is determined by the plant monitoring system, is a change in voltage over the electrodes, and in particular a resistance to applying a particular change in voltage. Initially the electrical energy 10 is applied at 55 kHz. When the voltage is at 3.890 kV, due to breakdown of the plant, the plant has reduced from a load of 100,000 ohms, to 10,000 ohms, and the power is 1513 watts. To maintain a higher power as the impedance of the plant continues to decrease, the frequency of the voltage is subsequently transitioned to 20 kHz. Consequently, the impedance of the electrical energy supply unit 4 is decreased to drive more power to the plant for optimal killing of the plant. Accordingly, the electrical circuitry is arranged to change the impedance of the power supply control the power of the electrical energy to be greater than if the impedance of the power supply was not changed.

The reduction in plant impedance to a tenth may be referred to as a transition threshold TRI, which triggers transition of the impedance of the power supply to a lower value. In variant embodiments, which are not illustrated, the transition threshold TRI may be set at other values, and/or there may be multiple thresholds implemented for more sophisticated control. It will be understood that the specific threshold will depend on the implementation of the apparatus 2 and the plants treated.

Figure 9:
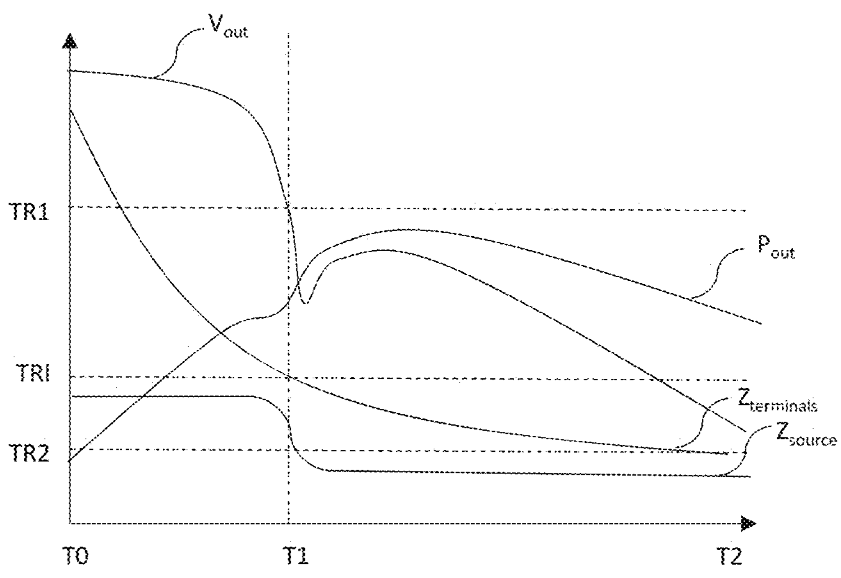
FIG. 9 is a graphical plot showing embodiment processes implemented by the apparatus of FIG. 1.

FIG. 9 illustrates an embodiment relationship between impedance between electrodes 18, 22 $Z_{terminals}$, and the corresponding adjustment of the impedance $Z_{source}$ of the electrical energy supply unit 4 to provide the desired power $P_{out}$ between electrodes 18, 22. Said relationship may be stored on the electrical circuitry 16, e.g. a memory unit thereof. In other embodiments, said relationship may be implemented with electrical componentry.

In general, it is preferred to control the power to the weed to be as high as possible as the weed's impedance reduces during breakdown. However, the power must be controlled to be within the safe capabilities of the power supply and/or not to be too high such that the weed is incinerated proximal the electrodes without the full mass of the weed receiving treatment.

It will therefore be understood that in variant embodiments, other graphical relationships between the determined impedance (which is based on the determined electrical property) and impedance of the electrical energy supply unit may be implemented. Moreover, in other embodiments, the impedance $Z_{source}$ of the electrical energy supply unit 4 may be adjusted to control other electrical quantities, such as $V_{out}$ the voltage across the electrodes 18, 22.

Whilst varying the impedance of the electrical energy supply 4, the electrical circuitry 16 may maintain the condition of resonance, e.g. including within 1% or 2.5% or 5% or 10% or 15% from the resonant frequency. In particular, the electrical circuitry 16 may maintain the frequency to be offset by a lower bound 0.5% or 1% or 2.5% or 5% or 10% or 15% from the resonant frequency and no more than an upper bound 20% or 30% or 40% or 50% or 60% from the resonant frequency, with any combination of said lower and upper bounds. By operating slightly above/below resonance the strain on the circuitry of the electrical energy supply unit 4, e.g. the switching system, may be reduced, e.g. without having extremely high voltages switched. The resonant circuit may, in particular, be operated slightly above or below the resonant frequency during the first stage when the voltage is high.

In embodiments, the electrical circuitry 16 controls the electrical energy supply unit 4 to maintain an impedance thereof to be within a predetermined amount of the determined electrical impedance between the electrodes. The predetermined amount may be within 2.5% or 5% or 10% or 15%.

In variant embodiments, alternative resonant circuit configurations may be implemented, e.g. the inductive element and capacitive element may be arranged in parallel. It will be understood that with such an implementation increasing the source impedance may increase the power.

Referring to FIG. 9, the electrical circuitry 16 controls the electrical energy 10 to be applied between the electrodes 18, 22 as at least a first stage between T0 and T1 and a second stage between T1 and T2.

The first stage comprises a high voltage stage, wherein the electrical potential $V_{out}$ over the electrodes 18, 22 is greater than that during the second stage. In particular during the first stage the electrical potential over the electrodes set above a first threshold TR1. In the embodiment, the voltage $V_{out}$ is illustrated in the first stage as exponentially decaying to the first threshold TR1, however $V_{out}$ may be any value above the TR1. The electrical circuitry is arranged to transition to the second stage when the determined electrical property indicates the impedance of the plant is below the transition threshold TRI.

In embodiments, which are not illustrate, the electrical circuitry 16 is arranged to control the current of the electrical energy during the first stage to be less than or equal to the current during the second stage. In embodiments, wherein upon transitioning to the second stage the current may be controlled to be at least: 20% or 30% or 40% or 50% higher than during the first stage In embodiments, electrical property related to an electrical impedance of the plant is continuously monitored and the power adjusted based on the determined electrical property. By continuously adjusting the power based on the impedance of the weed it can be ensured that the optimal power to kill the weed is transferred to the weed.

In an embodiment, which is not illustrated, the first threshold is set to one of: 3 kV or above; 5 kV or above; 15 kv or above; 30 kv or above. Upon transitioning to the second stage the voltage may be set to at least: 20% or 30% or 40 or 50% lower than the first threshold.

In embodiments the first stage is set for a predetermined amount of time, that is less than or equal to: 10 ms; or 20 ms; or 100 ms; or 1000 ms; or 5000 ms after which the second stage is transitioned to. In embodiments, a time duration of the second phase is greater than that of the first phase. Since the first stage implements the functionality of a high voltage cellular punch through, and the second stage implements the functionality of a high power for energy transfer, the first stage typically has a shorter time duration than the second stage. However, in embodiments the second stage may be shorter or have equal duration to the duration of the first stage.

In embodiments, which are not illustrated, the electrical circuitry 16 prior to implementing the first stage increases said electrical potential $V_{out}$ to the first threshold TR1 (and optionally above said threshold) over a predetermined period of time. Said increase may be linear, in other embodiments it may have another profile, such as non-linear, e.g. stepped or curved or a combination thereof. The increase may be from a predetermined initial voltage or from zero.

In embodiments, the electrical circuitry 16, e.g. during the first stage or second, stage determines, based on the determined electrical property, the electrical impedance $Z_{terminals}$ as above a treatment completion threshold TR2 and executes the first stage once again. The threshold TR2 may be selected to correspond to an open circuit between the electrodes 18, 22 (e.g. indicating the weed has been killed or moving of the electrodes 18, 22 to a new plant) in which case the first stage is applied again to reset for another weed.

In embodiments (which are not illustrated) the electrical circuitry, e.g. during the first stage or second stage, determines, based on the determined electrical property, the electrical impedance as below a short circuit threshold TR3 (which is less than TR2) and prevents supply of the electrical energy to the electrodes. The threshold TR3 may be selected to correspond to a short circuit between the electrodes 18, 22 (e.g. indicating the electrodes are touching) in which case the electrical energy to the electrodes is prevented to reduce the likelihood of damage to the apparatus.

In embodiments, the electrical circuitry is arranged to cyclically execute the at least first and second stage, e.g. to repeat the at least first and second stages as part of a cycle again and again.

In variant embodiments, which are not illustrated, non-resonant circuits are implemented, e.g. the energy supply unit 4 may implement a variable resistance in series to control its impedance $Z_{source}$.

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or computer readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Electrical apparatus
4 Electrical energy supply unit
28 Power supply
32 Electrical energy processing unit
34 Electrical transformer
6 Applicator unit
18 Applicator electrode
20 Body
8 Earth unit
22 Earth electrode
24 Body
10 Electrical energy
30 Supply electrical energy
12 Transmission circuit
16 Electrical circuitry
14 Plant
26 Ground

The invention claimed is:

1. An electrical apparatus to kill a plant or at least attenuate plant growth, the apparatus comprising:
- an electrical energy supply unit;
- an applicator unit comprising an applicator electrode;
- a return unit comprising a return electrode;
- electrical circuitry;
- the electrical energy supply unit comprising one or more capacitors which are arranged distal from the applicator electrode and the return electrode, the electrical energy supply unit arranged to apply electrical energy through a transmission circuit comprising the applicator electrode, and the return electrode,
- wherein the electrical circuitry is arranged to control a frequency of the electrical energy through the electrical energy supply unit by dynamically varying the frequency during treatment of the plant in response to a determined change in an electrical property related to an electrical impedance value of the plant to control a property of the electrical energy to the electrodes, wherein the property is one or more of voltage, current, or power.

2. The apparatus of claim 1, wherein said electrical circuitry implements a plant monitoring system to determine the electrical property related to the electrical impedance value of the plant, the electrical circuitry arranged to control said electrical impedance value of the electrical energy supply unit based on said determined electrical property to control said property of the electrical energy to the electrodes.

3. The apparatus of claim 2, wherein the plant monitoring system is arranged to determine the electrical property related to the electrical impedance value of the plant by measuring one or more properties of the electrical energy through the transmission circuit.

4. The apparatus of claim 1, wherein the electrical energy supply unit and the transmission circuit are arranged with the electrical impedance value of the electrical energy supply unit to control the power and/or the voltage of the electrical energy applied through the transmission circuit between said electrodes.

5. The apparatus of claim 2, wherein the electrical circuitry to control the electrical energy supply unit to maintain the electrical impedance value thereof to be within a predetermined amount of the electrical impedance value between the electrodes.

6. The apparatus of claim 1, wherein the electrical energy supply unit and the transmission circuit are arranged with a reduction of the electrical impedance value of the electrical energy supply unit to increase the power of the electrical energy applied through the transmission circuit between said electrodes.

7. The apparatus of claim 1, wherein the electrical energy supply unit includes an inductive element and the one or more capacitors arranged as a resonant circuit, wherein the electrical circuitry is arranged to change the electrical impedance value of the electrical energy supply unit to control the power by changing one or more of: the frequency of the electrical energy; an inductance of the inductive element; a capacitance of the one or more capacitors.

8. The apparatus of claim 7, wherein the electrical circuitry arranged to operate the resonant circuit offset from resonance by at least ±5%.

9. The apparatus of claim 2, wherein the electrical circuitry arranged to transition the electrical impedance value of the electrical energy supply unit to a lower value, when the determined electrical property indicates the electrical impedance value of the plant is below a transition threshold.

10. The apparatus of claim 9, wherein the electrical circuitry arranged to control the electrical energy to be applied as a first stage and a second stage,
- wherein during the first stage an electrical potential over the electrodes is controlled to be above a first threshold,
- wherein during the second stage an electrical potential over the electrodes is controlled to be below the first threshold; and
- wherein the electrical circuitry arranged to transition to the second stage when the determined electrical property indicates the electrical impedance value of the plant is below the transition threshold.

11. The apparatus of claim 10, wherein the electrical circuitry arranged to control the power of the electrical energy during the second stage to be greater than in an alternative second stage wherein the electrical impedance value of the electrical energy supply unit was not changed from that of the first stage.

12. The apparatus of claim 10, wherein the electrical circuitry arranged to, prior to the first stage, increase said electrical potential to the first threshold over a predetermined period of time.

13. The apparatus of claim 11, wherein the electrical circuitry arranged to determine, based on the determined electrical property, that the electrical impedance value is above a treatment completion threshold and to re-execute the first stage.

14. The apparatus of claim 11, wherein the electrical circuitry arranged to determine, based on the determined electrical property, the electrical impedance value is below a short circuit threshold and to prevent supply of the electrical energy to the electrodes.

15. The apparatus of claim 9, wherein the electrical circuitry arranged to transition the electrical impedance value of the power supply unit sequentially to a plurality of lower values each corresponding to when one of a plurality of sequentially lower transition thresholds is met.

16. A method of treating a plant with electrical energy, the method comprising:

applying the electrical energy, with an electrical energy supply unit comprising one or more capacitors, which are arranged distal from an applicator electrode and a return electrode, the electrical energy applied to the plant from the applicator electrode and the return electrode;

in response to a determined change in an electrical property related to an electrical impedance value of the plant; and controlling a frequency of the electrical energy through the electrical energy supply unit by dynamically varying the frequency during treatment of the plant based on a monitored said electrical property to control a property of the electrical energy to the electrodes, wherein the property is one or more of voltage, current, or power.

17. The method of claim 16 comprising:

determining the electrical property related to the electrical impedance value of the plant between said electrodes;

controlling the electrical impedance value of the electrical energy supply unit based on the determined said electrical property.

18. An electrical apparatus comprising, electrical circuitry to implement the method of claim 16.

19. An electrical apparatus comprising, a computer program to implement the method of claim 16.

* * * * *